United States Patent [19]

Thompson

[11] 3,916,196

[45] Oct. 28, 1975

[54] INFRARED DETECTOR LINE ARRAY SCANNER

[75] Inventor: Arthur V. Thompson, Telford, Pa.

[73] Assignee: The United States of America as represented by the Secretary of the Navy, Washington, D.C.

[22] Filed: Dec. 27, 1971

[21] Appl. No.: 212,278

[52] U.S. Cl. .................................. 250/347; 250/349

[51] Int. Cl.[2] .......................................... G02B 23/08

[58] Field of Search............... 250/83.3 H, 347, 349; 350/7

[56] References Cited

UNITED STATES PATENTS

| | | | |
|---|---|---|---|
| 3,449,035 | 6/1969 | Denaro | 350/7 |
| 3,554,628 | 1/1971 | Kennedy | 250/83.3 H |
| 3,665,196 | 5/1972 | Macall | 250/83.3 H |

*Primary Examiner*—James W. Lawrence
*Assistant Examiner*—B. C. Anderson
*Attorney, Agent, or Firm*—R. S. Sciascia; Henry Hansen

[57] ABSTRACT

Mechanical scanning of a 360° annular zone by the movement of optical components is obtained by rotation of a first optical plane scan mirror at twice the rotational velocity of a reflective image inverter right angle mirror assembly. A telescopic converging lens is fixed between the plane mirror and the right angle mirror assembly. The plane mirror is aligned at an angle tilt with the vertical and is rotated, projecting an image through the converging lens onto the right angle mirror assembly. The image is then projected onto a fixed linear array of infrared detector elements.

10 Claims, 4 Drawing Figures

INFRARED DETECTOR LINE ARRAY SCANNER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to surveillance techniques and more particularly to a mechanical scanning system used in conjunction with infrared elemental detectors for providing pictorial displays, detection or tracking of objects.

At present one of the most sensitive techniques for infrared detector systems is by mechanical scanning with infrared telescopes having one or more elemental detector elements or sensors and where required associated optical components are included. The radiation incident to an infrared detector is converted to an electrical signal and the variation of the incident radiant intensity as the detector element is scanned over a field results in a video signal which is amplified and displayed pictorially or processed for other use.

A system using a single detector element must be scanned in two dimensions to obtain a field of coverage. This method of scanning has severe drawbacks when high frame rate, resolution in a wide field are required.

Therefore, the present trend is to use a line of individual detector elements with associated amplifiers so that a field can be covered by scanning a single dimension perpendicular to the detector line. The majority of existing detection sets using linear detector arrays have limited field size and frame rate. Those designed for 360° field of coverage at a reasonable frame rate have incurred alternate problems of either designing rotating cryogenic pipe joints plus hundreds of slip ring connections to a continuously moving detector, or rotating a complete heavy assembly of telescope, detector, dewar, cryogenic refrigerator, signal amplifiers, signal processors and other associated components at a required speed.

SUMMARY OF THE INVENTION

Accordingly, it is a general purpose and object of the invention to provide an improved infrared detector scanning system. It is a further object to provide a scanning system utilizing a linear sensor array in which field coverage can be obtained by scanning in a single dimension. Another object is to provide a lighter scanning system in whcih only optical components traverse a given path.

This is accomplished according to the present invented by utilizing mechanical scanning techniques covering a wide 360° annualar field in space by either continuous rotation or sector scan motion of optical components, thus permitting components such as the detector, dewar, refrigerating unit and amplifiers to be fixed in space without the normal slip ring requirements. A scanning mirror reflects an image through a converging lens into an inverting-type optical component rotating at one-half velocity of the scanning mirror. The inverting-type optical mirror counteracts the optical rotation of the image field relative to a fixed detector array as the field is scanned by the scanning mirror through 360° total coverage. The stytem permits a scan of 360° annular coverage of fixed angular width by rotating the plane mirror at a predetermined angle such as 45° with the vertical axis on which common vertical axis the converging lens and inverting-type optical component are mounted. The fixed detector array is mounted in a plane parallel to the converging lens.

DESCRIPTION OF THE PREFERRED EMBODIMENT

Figure 1:
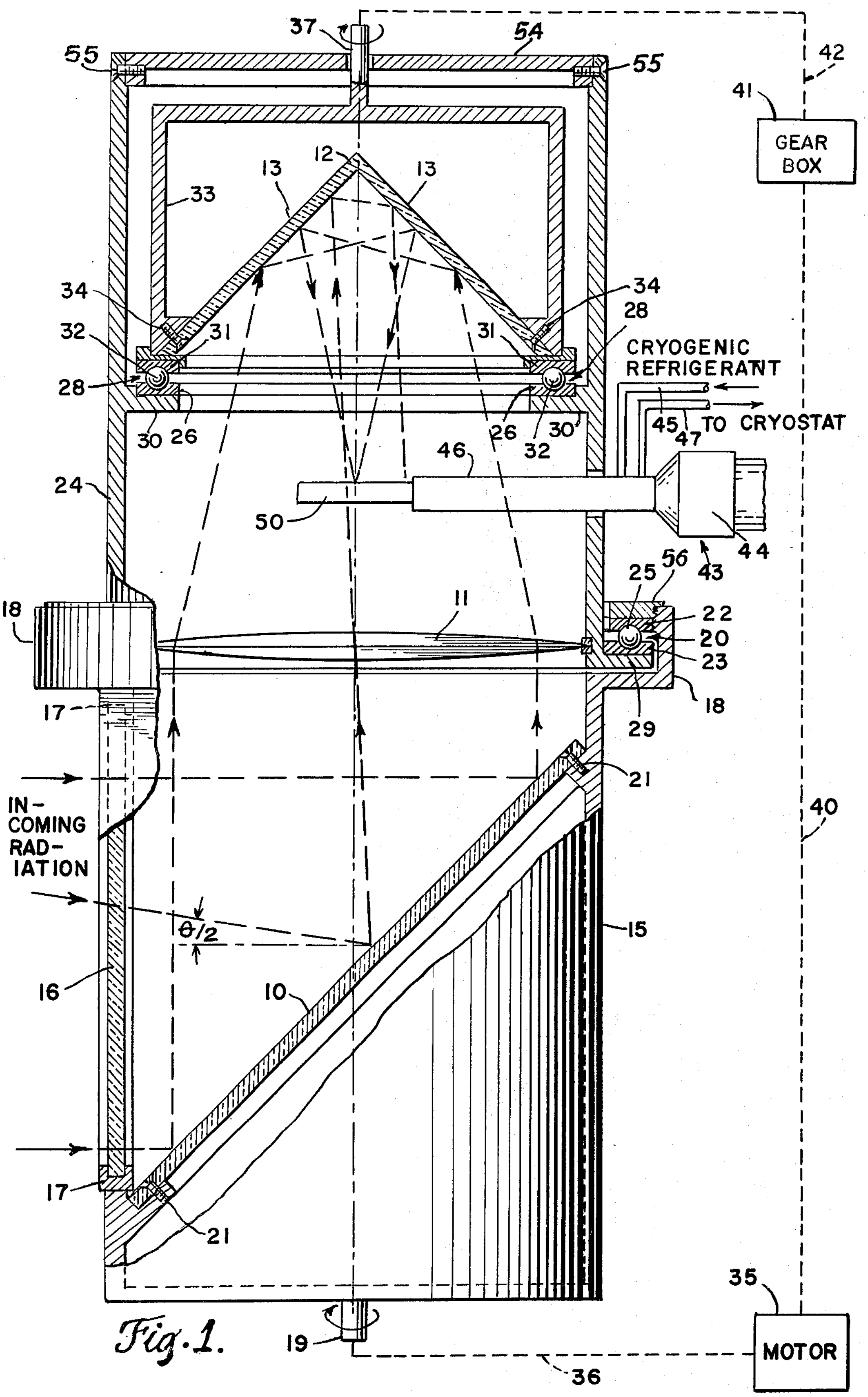
FIG. 1 is an embodiment of the infrared scanner according to the present invention in diagrammatic form with some elements in cross section to show the operation more precisely and other elements in one line block diagram.

Referring now to FIG. 1 there is shown an oval shaped plane scanning mirror 10 tilted at an angle with both the horizontal and vertical axes receiving incoming radiation. The top and bottom lines of incoming radiation signify parallel rays at an infinite distance from the mirror 10. The center ray signifies a ray at the maximum elevation angle that is processed. The radiation is reflected off scanning mirror 10 onto a converging telescopic lens 11. The radiation is then bent on passing through a telescopic lens 11 and impinges on a rotating right angle plane mirror assembly 12 acting as a reflective image inverter. Roof reflector assembly 12 rotates on the principal axis of the scanning device that bisects the 90° intersecting angle of the roof reflector 12. Roof reflector 12 comprises a pair of plane mirrors 13 which may be rectangular in shape. Infrared detector element line array 50 then receives the incoming radiation from reflector 12.

A lower support cover 15 for mirror 10 has a circular cross-sectional area on top with a window having a frame 17 for holding a transparent sheet of magnesium floride 16 or other material transparent to the incoming radiation. As an alternative the transparent material 16 may be removed and the window cutout left empty. Lower cover 15 has a mounting extension 18 for connecting lower cover 15 to a housing 24.

A bearing assembly 20 is connected between lower cover 15 and the housing 24 so that the lower cover 15 can be rotated freely with respect to the housing 24. The rotation is provided by a shaft 19 which forms part of cover 15. The shaft 19 is driven by a motor 35 which has its own output shaft directly coupled to shaft 19 by means of a mechanical linkage 36. The mirror 10 is affixed to cover 15 by means of screws 21 so that the mirror 10 scans at the rotational velocity of cover 15.

The bearing assembly 20 has an upper race 22, a lower race 23 and ball bearings 25. The upper race 22 is affixed to threaded piece 56 which is attached to mounting extension 18 of lower cover 15. The lower race 23 is connected to lip 29 of housing 24.

Housing 24 has a protruding segment 30 for supporting reflector 12 and associated components. A bearing assembly 28 ssupplies the interface between reflector 12 and housing 24 so that the reflector 12 may be freely rotated within housing 24. The bearing assembly 28 comprises a lower race 26 connected to segment 30, an upper race 31 connected to a bar support 33 and ball bearings 32. A bar support 33 is U-shaped with a shaft 37 for rotational purposes. Reflector assembly 12 is connected to bar support 33 by screws 34. The combination of bar support 33, reflector 12 and upper race 31 is free to rotate within house 24.

A plate 54 is connected to the top of cover 34 by means of screws 55 for assembly purposes.

The motor 35 that is connected to shaft 19 by means of linkage 36 for rotating mirror 10 is also connected through mechanical linkage 40, gear box 41 and mechanical linkage 42 to shaft 37 of bar support 33 for reflector 12. The gear box 41 reduces the rotational velocity of shaft 37 to one-half that of the motor 35 output shaft while shaft 19 is directly coupled to motor 35 to have the same rotational velocity as the motor output shaft. This gives the mirror 10 twice the rotational velocity of reflector 12. Obviously reduction gears can be placed between motor 35 and shaft 19 with the requirement that shaft 37 be reduced to one-half the rotational velocity of shaft 19.

An infrared detector unit 43 is inserted through housing 24 with detector elements 50 that may be made of indium-antimonide formed in a linear array that is located in the focal plane of converging lens 11 for clear reception of the incoming radiation. The infrared detector unit has detector channel amplifiers 44, piping 45 supplying a cryogenic refrigerant for cooling the infrared detector unit 43. A dewar 46 receives the cryogenic refrigerant for cooling the detector elements 50 and piping 47 provides a return path. Such infrared detector units that operate in the above manner are well known to those of skill in the art and may be similar to that shown in brochure entitled "Infrared Detector Assembly", page 4, August 1968, published by Electronics Division, AVCO, Inc., Cincinnati, OH.

Figure 2:
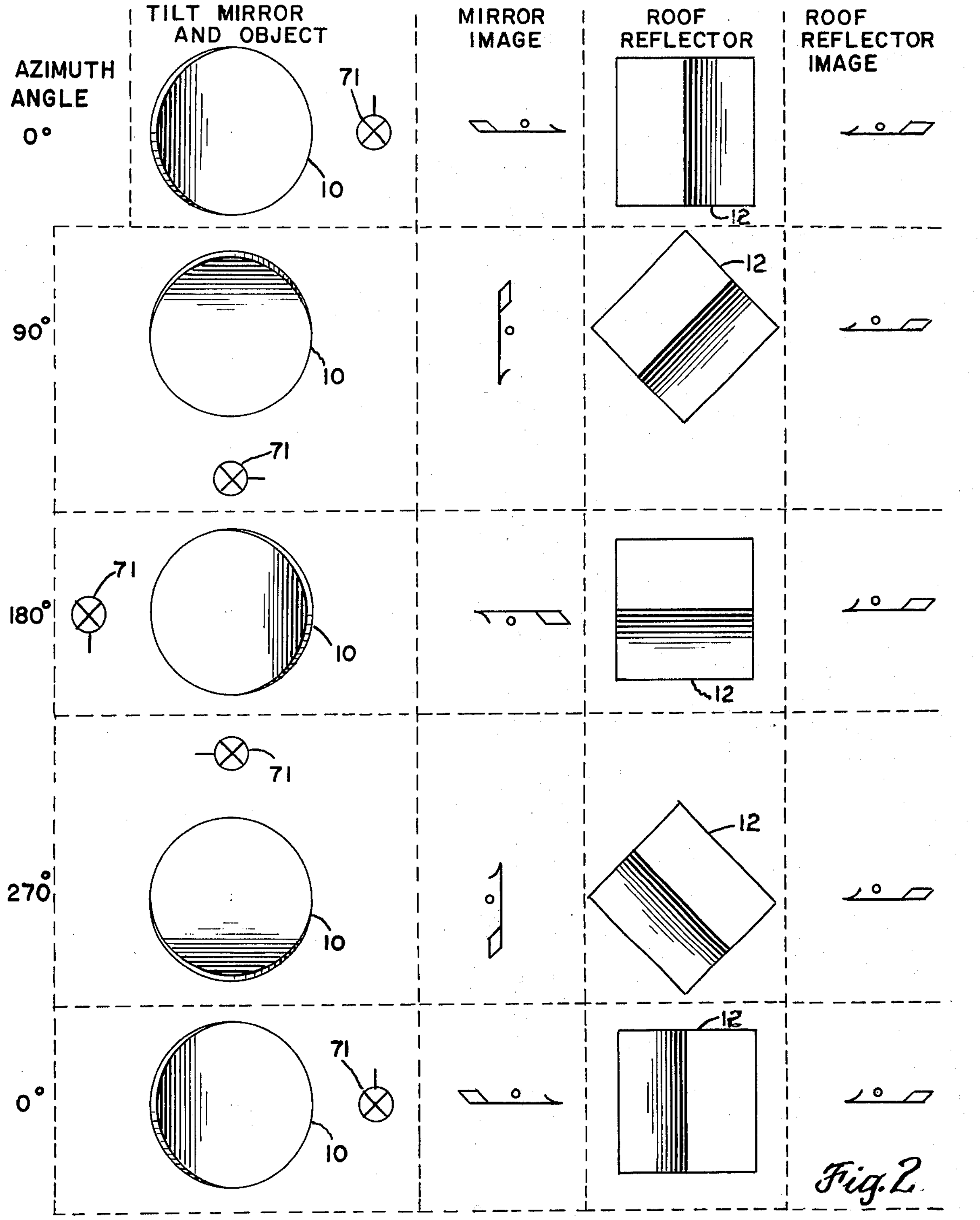
FIG. 2 is a diagram showing the operation of optical components of the specific embodiment.

Referring now to FIG. 2 there is shown a top view of the relative position of the mirror 10, roof reflector 12, line objects 71 and images of objects 71 through a 360° azimuth scan by mirror 10. The line objects 71 represent linear increments in space traversed by mirror 10. It can be seen that the line object 71 in space depicted by an arrow 71 as seen by the linear array 50 is the image of the roof reflector, and is fixed in direction so that incoming parallel rays intersecting mirror 10 always appear in the same direction to linear detector array 50. It is to be noted that the rotation of roof reflector mirror 12 at one-half the angular velocity of mirror 10 is required to maintain this orientation of incoming rays. It can be further seen that if roof reflector 12 were omitted the linear array would have to be rotated at the same angular velocity as mirror 10.

Figure 3A:
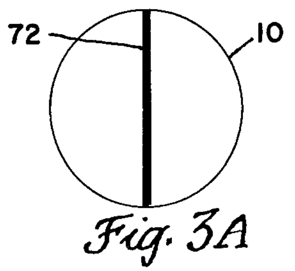
FIGS. 3 and 3B show the field coverage at any instant of time by the scanning system of FIG. 1.
Figure 3B:
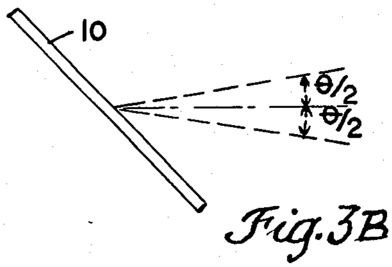

Referring now to FIGS. 3*a* and 3*b* there is shown a front view of mirror 10 with a vertical plane 72 bisecting it. Only rays parallel with this vertical plane can be reflected onto the linear array 50. In addition only the rays interesecting mirror 10 that make an angle with a horizontal plane not greater than $\theta/2$ as shown in FIG. 3*b* will be sensed by linear array 50.

The operation of the device will now be explained with reference to the figures. The incoming radiation impinges on the surface of mirror 10 and is reflected through converging telescopic lens 11. The radiation is then twice reflected off plane miror assembly 12 onto the linear array of detector elements 50. The detector elements 50 are located in the focal plane of converging lens 11. The array 50 and dewar 46 are made as thin as possible so as not to provide a large obstruction to the convergent beam of the telescopic lens 11. The motor 35 rotates mirror 10 at twice the rotational velocity of mirror assembly 12 in a well-known scanning pattern in order that the object field retains its same direction during the 360° scan as sensed by linear array sensor 50.

Mirror 10 need not be fixed in angle tilt within cover 15 but could be provided with means for adjusting its angle of elevation. The housing 24 and infrared detector unit 43 are fixed in space with respect to components rotated by upper and lower shafts 37 and 19 respectively.

There has therefore been shown a system for providing wide angle coverage of an area for surveillance coverage by means of scanning in one dimension with optical components reflecting incoming radiation to a fixed infrared detector linear array 50. In this manner a wider area with a higher frame rate is obtained than heretofore known.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A scanning assembly comprising:

a plane mirror assembly for reflecting incoming radiation adapted to be rotated at a first rotational velocity;

a converging lens connected to receive and converge the reflected incoming radiation from said plane mirror assembly;

a right angle mirror assembly connected to rotate at one-half said first rotational velocity for receiving and reflecting the converged radiation from said converging lens; and a detector assembly having a sensor at the focal point of said converging lens for receiving the reflected converged radiation from said right angle plane mirror assembly.

2. A scanning assembly according to claim 1 further comprising;

a housing slidably connected to said plane mirror assembly, fixedly connected to said converging lens and slidably connected to said right angle plane mirror assembly.

3. A scanning assembly according to claim 2 wherein said housing further comprises a cutout for inserting said detector assembly.

4. A scanning assembly according to claim 3 further comprising:

a first bearing assembly connected between said plane mirror assembly and said housing; and a second bearing assembly connected between said right angle mirror assembly and said housing.

5. A scanning assembly according to claim 4 wherein said plane mirror assembly further comprises:

a plane mirror adapted to receive incoming radiation;

a cover having a window for conducting said incoming rays connected to said mirror and said cover having a shaft adapted to be rotated and said cover further connected slidably to said housing.

6. A scanning assembly according to claim 5 further comprising:

a transparent sheet of magnesium fluoride inserted in said window.

7. A scanning assemlby according to claim 5 wherein said right angle mirror assembly further comprises:

a U-shaped bar slidably mounted on said housing with a shaft on said U-shaped bar adapted to be rotated;

a pair of plane rectangular mirrors with the reflective surfaces of each mirror arranged adjacently and at right angles to each other and said pair of plane rectangular mirrors connected to said U-shaped bar.

8. A scanning assembly according to claim 7 wherein said detector assembly further comprises:

a line array of infrared detector elements located in the focal plane of said converging lens;

a dewar connected to said line array for cooling purposes; and piping connected to said dewar for cooling purposes.

9. A scanning assembly according to claim 8 further comprising:

a motor connected to rotate said plane mirror assembly at a first rotational velocity and said motor further connected to rotate said right angle mirror assembly at one-half said first rotational velocity.

10. A scanning assembly according to claim 9 further comprising:

a gear box connected intermediate said motor and said right angle mirror assembly.

* * * * *